Patented Feb. 19, 1929.

1,702,852

UNITED STATES PATENT OFFICE.

LEOPOLD RUZICKA, OF GENEVA, SWITZERLAND, ASSIGNOR TO M. NAEF & CO., OF GENEVA, SWITZERLAND, A COMPANY OF SWITZERLAND.

PROCESS FOR THE PREPARATION OF MONOCYCLIC KETONES HAVING MORE THAN NINE RING MEMBERS.

No Drawing. Original application filed June 9, 1925, Serial No. 36,049, and in Switzerland June 16, 1924. Divided and this application filed November 19, 1926. Serial No. 149,544.

The carbon rings hitherto known have at most nine ring members. According to the generally accepted strain theory of A. von Baeyer the idea has arisen that carbon rings having a larger number of members either cannot be prepared or also must be very unstable.

It has now been discovered, that the whole series of multi-membered cyclic ketones having from ten to eighteen ring members in one ring can be obtained by the usual methods for preparing ketones. From mixtures of such di-carboxylic acids as can be obtained for example in the case of certain methods of preparation, as well as from natural products, mixtures of the ketones in question are produced, which, even in this form, can be used for technical purposes. The total ketone obtained from pure di-carboxylic acids is not homogeneous but contains, besides polymethylene ketones, admixtures of other ketones. It has further been found that the proportion of pure polymethylene ketone in this total ketone is higher if the cerium salts of the dicarboxylic acids are employed for the ketone preparation. These salts also give in general a higher yield of total ketone than other metallic salts.

The noteworthy observation has also been made in this connection that starting from cyclodecanone the yields of monocyclic ketone from dicarboxylic acid in general increase with an increasing number of ring members. The multi-membered ketones, contrary to what might have been expected, are more stable in the presence of acid and alkaline agents and raised temperature than the five-membered and six-membered monocyclic ketones.

These new ketones have a characteristic smell, and moreover cyclo-pentadecanone and the adjacent ketones have the typical musk and civet smell and can be used as substitutes for these natural products. It has also been found that the scent-carrier of natural musk and civet are closely related chemically to these ketones.

Example 1.

The cerium salt of tetradecane-1.14-dicarboxylic acid is heated, preferably in a vacuum, and advantageously with the addition of a good conductor of heat, such as copper or iron turnings, up to from 300 to more than 400° C., and the distillate obtained therefrom is worked up by fractional distillation. The chemical reaction takes place according to the following equation:

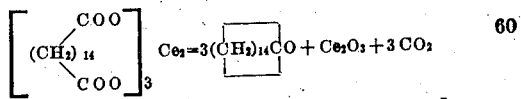

For the preparation of cyclo-pentadecanone in a pure state, the fraction having about the same boiling point as this ketone (for example those boiling at from 100 to 150° C., in a high vacuum) are treated with semicarbazide and the resulting semicarbazone recrystallized from alcohol. By treating the purified semicarbazone with acids the cyclo-pentadecanone can then be regenerated. The latter melts at 63° C. and boils at 120° C. (at 0.3 mm.) while the semicarbazone melts at 187° C. In the mother liquor of this semicarbazone there is a mixture of semicarbazones melting at a lower temperature which is not sharply defined and giving upon treatment with acids a ketone mixture. For the isolation of the ketones, instead of semicarbazide other of the usual ketone reagents may be employed. Upon oxidation with chromatic acid, tridecane-1.13-dicarboxylic acid is obtained from the cyclo-pentadecanone.

Example 2.

Tetradecane-1.14-dicarboxylic acid is gradually heated in the presence of cerium up to above 400° C. at the close preferably in a vacuum and the resulting distillate is worked up, according to the method described in Example 1.

Example 3.

From a mixture of the cerium and thorium salts of tetradecane-1.14-dicarboxylic acid is obtained by the method described in Example 1, cyclo-pentadecanone.

I claim:

1. A process for the formation of monocyclic-ketones having more than nine ring members in one ring comprising heating cerium salts of polymethylene dicarboxylic acid having more than ten carbon atoms in a normal chain the carboxylic acid groups being linked to the end carbons thereof to decompose the same.

2. A process for the formation of cyclopentadecanone having typical musk smell, consisting in heating the cerium salts of tetradecane-1.14-dicarboxylic acid and working up by fractional distillation the distillate obtained therefrom.

3. A process for the formation of monocyclic ketones having more than nine ring members comprising decomposing a mixture of thorium and cerium salts of a polymethylene dicarboxylic acid having more than ten carbon atoms in a normal chain, the carboxylic acid groups being linked to the end carbons thereof.

4. A process for the formation of cyclopentadecanone comprising heating a mixture of the cerium and thorium salts of tetradecane-1.14-dicarboxylic acid and working up by fractional distillation the resulting distillate.

In testimony whereof I affix my signature.

LEOPOLD RUZICKA.